US011079813B2

(12) United States Patent
Chuang

(10) Patent No.: US 11,079,813 B2
(45) Date of Patent: Aug. 3, 2021

(54) COMPUTER CASE

(71) Applicant: ASUSTEK COMPUTER INC., Taipei (TW)

(72) Inventor: Ming-I Chuang, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 16/847,131

(22) Filed: Apr. 13, 2020

(65) Prior Publication Data

US 2020/0371567 A1 Nov. 26, 2020

(30) Foreign Application Priority Data

May 24, 2019 (TW) ................. 10820662.8

(51) Int. Cl.
*G06F 1/18* (2006.01)
*G06F 1/20* (2006.01)

(52) U.S. Cl.
CPC ............. *G06F 1/184* (2013.01); *G06F 1/188* (2013.01); *G06F 1/20* (2013.01)

(58) Field of Classification Search
CPC .......... G06F 1/181; G06F 1/185; G06F 1/203; G06F 1/184; G06F 1/188; G06F 1/1615; G06F 1/166; H05K 2201/10446; H05K 3/301; H05K 7/1409; H05K 7/1417; H05K 7/1429
See application file for complete search history.

(56) References Cited

U.S. PATENT DOCUMENTS

| 4,047,242 | A | * | 9/1977 | Jakob | H05K 7/1417 361/714 |
|---|---|---|---|---|---|
| 5,262,921 | A | * | 11/1993 | Lamers | H05K 7/20254 165/104.33 |
| 6,462,959 | B1 | * | 10/2002 | Fu | G06F 1/184 211/41.17 |
| 7,035,111 | B1 | * | 4/2006 | Lin | G06F 1/18 361/748 |
| 7,186,145 | B1 | * | 3/2007 | Feldman | H05K 1/117 439/638 |
| 7,315,457 | B1 | * | 1/2008 | Chen | G06F 1/184 312/223.2 |
| 9,665,134 | B2 | * | 5/2017 | Degner | H05K 7/20172 |
| 2011/0064536 | A1 | * | 3/2011 | Chen | G06F 1/183 411/84 |
| 2011/0295442 | A1 | * | 12/2011 | Bekker | G05D 23/1917 700/300 |
| 2012/0287571 | A1 | * | 11/2012 | Santos | G06F 1/206 361/679.48 |

(Continued)

FOREIGN PATENT DOCUMENTS

GB 2567824 A * 5/2019 ............. G06F 1/20

*Primary Examiner* — Stephen S Sul
*Assistant Examiner* — Michael A Matey
(74) *Attorney, Agent, or Firm* — Muncy, Geissler, Olds & Lowe, P.C.

(57) ABSTRACT

A computer case configured to dispose a motherboard and a graphics card therein is provided. The computer case includes an outer frame and a motherboard carrier. The outer frame includes a side surface. The motherboard carrier is connected to the outer frame and configured to dispose the motherboard thereon. A body of the motherboard carrier and the side surface form a predetermined angle of greater than 0°.

7 Claims, 3 Drawing Sheets

(56) References Cited

U.S. PATENT DOCUMENTS

| | | | | |
|---|---|---|---|---|
| 2016/0098068 A1* | 4/2016 | Liu | ........................... | G06F 1/20 |
| | | | | 361/679.5 |
| 2018/0314665 A1* | 11/2018 | Han | ....................... | G06F 1/165 |
| 2019/0307012 A1* | 10/2019 | Liu | ...................... | H05K 5/0217 |
| 2019/0391622 A1* | 12/2019 | Hsu | ........................... | G06F 1/20 |
| 2020/0296849 A1* | 9/2020 | Sato | ...................... | G06F 1/181 |
| 2020/0326761 A1* | 10/2020 | Huang | ................... | G06F 1/181 |

* cited by examiner

COMPUTER CASE

CROSS-REFERENCE TO RELATED APPLICATION

This application claims the priority benefit of Taiwan Application Serial No. 108206628, filed on May 24, 2019. The entirety of the above-mentioned patent application is hereby incorporated by reference herein and made a part of the specification.

BACKGROUND OF THE INVENTION

Field of the Invention

The disclosure relates to a computer case, and in particular, to a computer case configured to dispose a motherboard and a graphics card therein.

Description of the Related Art

With the development of e-sports, the designs of computer cases, motherboards, graphics cards, and other electronic devices are requested to have more functionalities and to have improved visual aesthetics of the exteriors.

Generally, a graphics card is vertically disposed on the motherboard, and the modules on the graphics card cannot completely present due to a crowded arrangement inside a case. In addition, a large number of wires connected to the motherboard results a mess inside the casing. A larger casing solves problems above, however, big dimension is difficult to meet the requirement of improved visual aesthetics of the exteriors.

BRIEF SUMMARY OF THE INVENTION

The disclosure provides a computer case configured to dispose a motherboard and a graphics card therein. The computer case includes an outer frame and a motherboard carrier. The outer frame includes a front plate, a bottom plate, and a side surface. The motherboard carrier is connected to the outer frame and configured to dispose the motherboard thereon. A body of the motherboard carrier and the side surface form a predetermined angle, and the predetermined angle is greater than 0°.

According to an embodiment of the disclosure, the predetermined angle is 0° to 90°.

According to an embodiment of the disclosure, the predetermined angle is 5° to 45°.

According to an embodiment of the disclosure, the outer frame further includes a back plate. The motherboard carrier is located between the front plate and the back plate.

According to an embodiment of the disclosure, the computer case further includes a partition plate disposed on a back side of the bottom plate. The partition plate, the bottom plate, and the back plate form an accommodating space to accommodate a power supply.

According to an embodiment of the disclosure, a space is formed between the side surface and the motherboard carrier.

According to an embodiment of the disclosure, an end of the motherboard carrier near the front plate is close to the side surface, and the other end of the motherboard carrier distant from the front plate is spaced apart from the side surface by a predetermined distance.

According to an embodiment of the disclosure, the side surface includes an air vent. The air vent is located between the motherboard carrier and the front plate.

The motherboard carrier of the computer case provided in the disclosure bends inward from the outer frame, and the motherboard is obliquely disposed in the computer case, to enhance exterior visual effects. In addition, in the computer case provided in the disclosure, a space is formed between the motherboard carrier and the outer frame, to hide wires on the motherboard there between and further provide space for an additional cooling effect for the motherboard without increasing the size of the case.

DETAILED DESCRIPTION OF THE EMBODIMENTS

Specific embodiments of the disclosure will be described in further detail below with reference to schematic drawings. The advantages and features of the disclosure will become more apparent from the following description and claims. It is to be noted that the drawings are all in a very simplified form and are not drawn to accurate scale, but are merely used for convenience and clarity of description of the embodiments of the disclosure.

Figure 1:
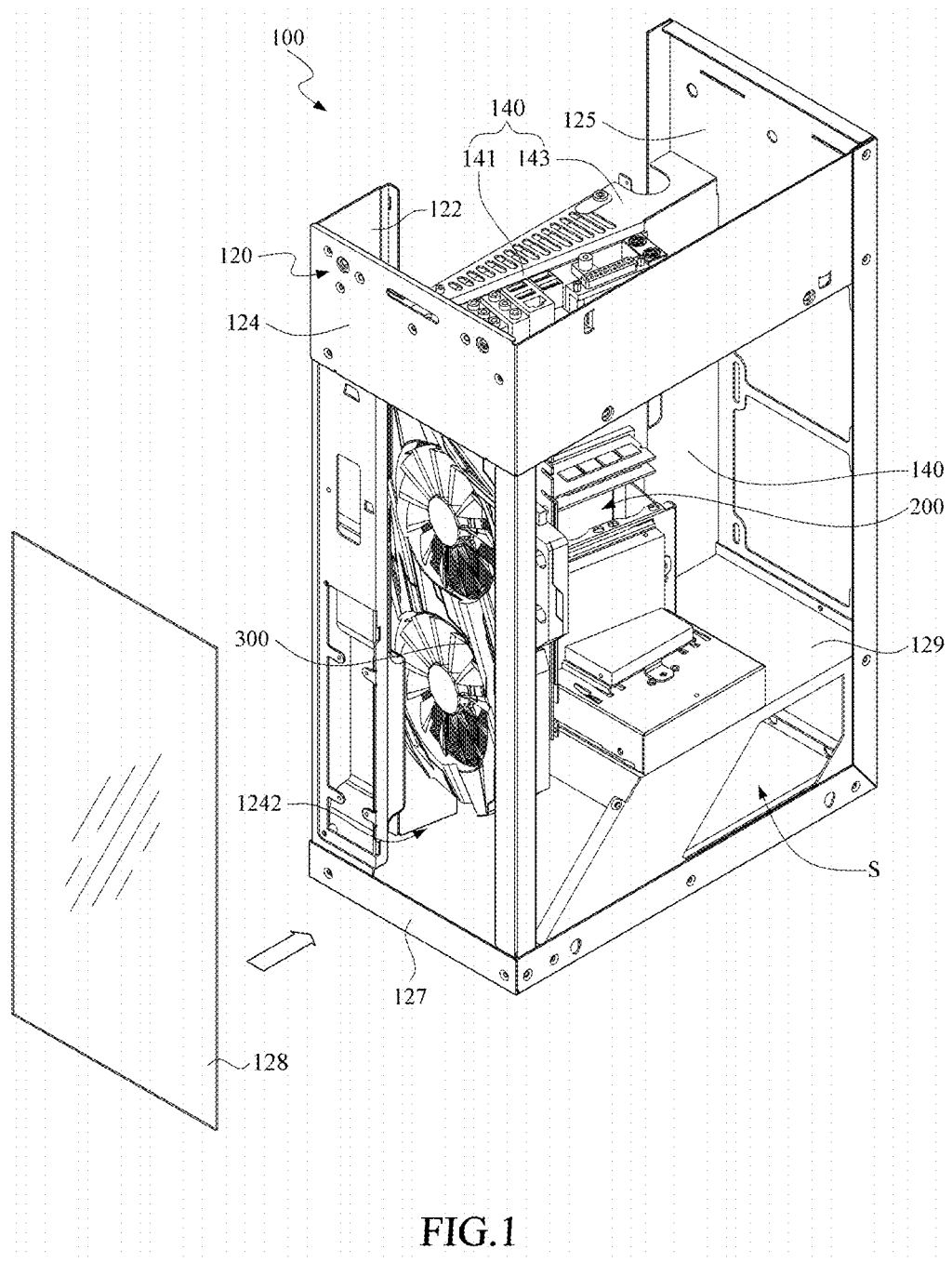
FIG. 1 is a schematic three-dimensional diagram of a computer case according to an embodiment of the disclosure.
Figure 2:
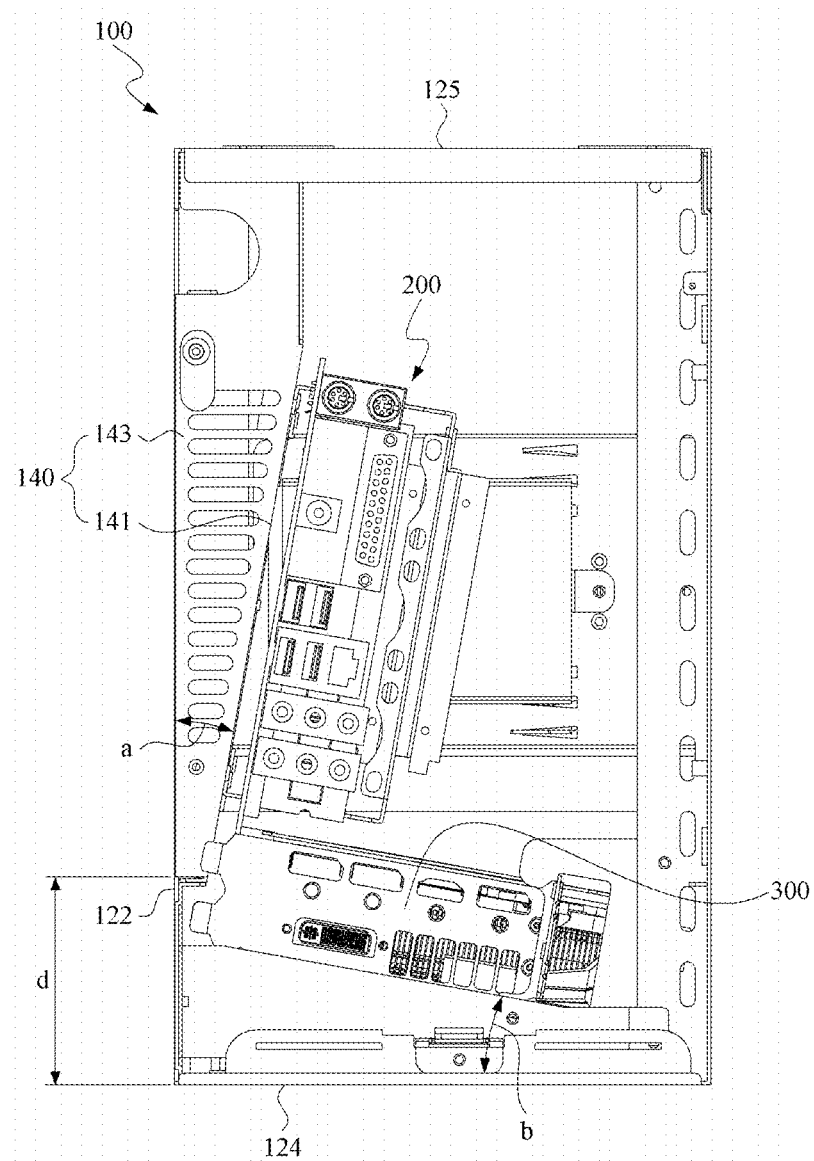
FIG. 2 is a top view of the computer case in FIG. 1.
Figure 3:
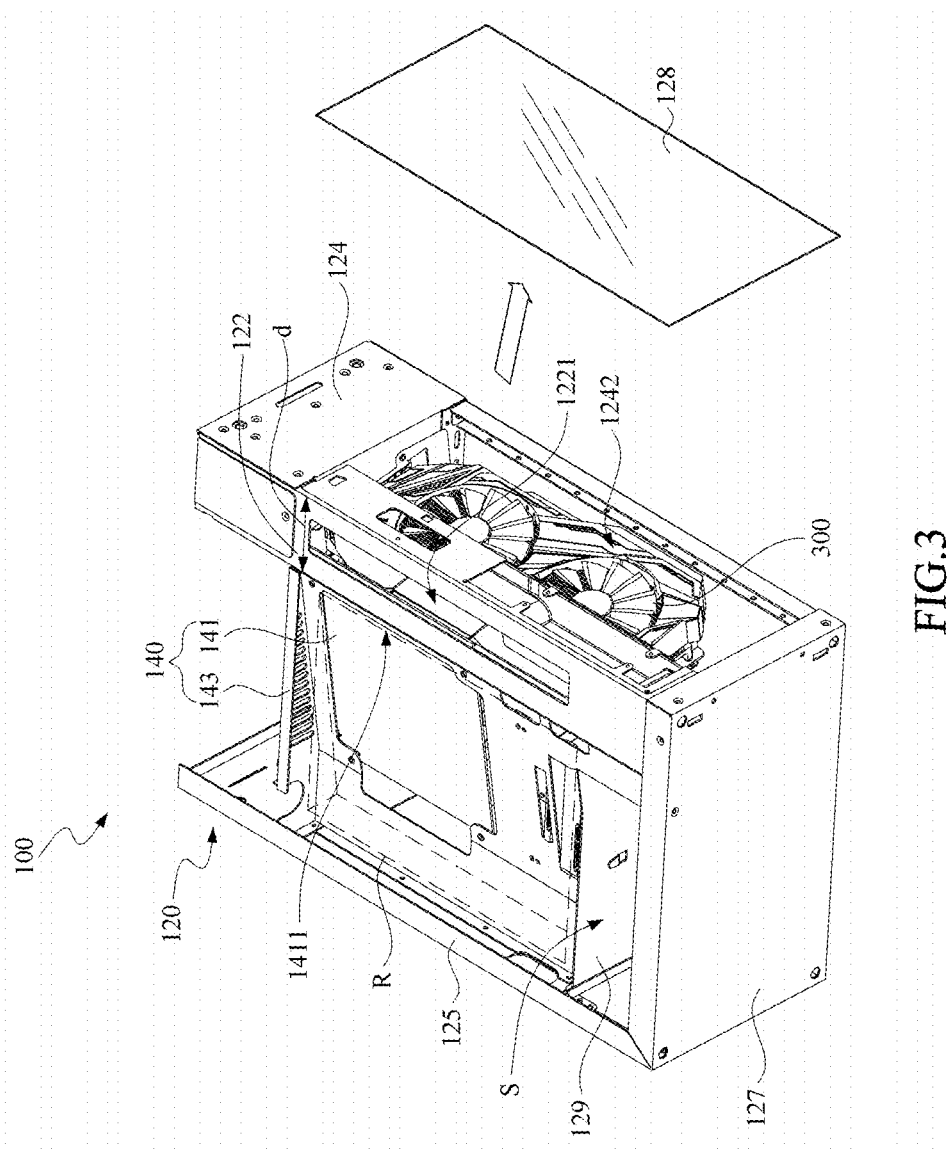
FIG. 3 is a schematic three-dimensional diagram of the computer case in FIG. 1 from another viewing angle.

FIG. 1 is a schematic three-dimensional diagram of a computer case according to an embodiment of the disclosure. FIG. 2 is a top view of the computer case in FIG. 1. FIG. 3 is a schematic three-dimensional diagram of the computer case in FIG. 1 from another viewing angle. To help illustrate the disclosure, some components (such as a side plate on one side) of the computer case 100 are removed in the drawings to show the internal configuration.

The computer case 100 is configured to dispose a motherboard 200 and at least one graphics card 300 (in the drawings, one graphics card is used as an example) therein. In this embodiment, the graphics card 300 is vertically disposed in the computer case 100, that is, the graphics card 300 is installed along a vertical direction of the computer case 100. In addition, the graphics card 300 is directly inserted on the motherboard 200.

The computer case 100 includes an outer frame 120 and a motherboard carrier 140. The outer frame 120 includes a front plate 124, a back plate 125, a bottom plate 127, and a side surface 122. The front plate 124 and the back plate 125 are respectively located on front and back sides of the outer frame 120. The bottom plate 127 is located at the bottom of the outer frame 120.

A body 141 of the motherboard carrier 140 and the side surface 122 form a predetermined angle a, and the predetermined angle a is greater than 0°. In an embodiment, the motherboard carrier 140 is fixed to the outer frame 120, and the body 141 of the motherboard carrier 140 is bent at a bending portion 1411 to form a predetermined angle a with the side surface 122. The predetermined angle a is greater than 0°. A maximum value of the predetermined angle a is related to the design of the entire case and is not limited herein. In an embodiment, the predetermined angle a is greater than 0° and less than 90°. In an embodiment, the predetermined angle a is 5° to 45°. The predetermined angle a is adjusted according to actual dimensions such as the size of the motherboard, the width of the computer case, the position of the graphics card, the size of the graphics card, and other parameters.

By obliquely disposing the motherboard carrier 140, a space R is formed between the side surface 122 and the motherboard carrier 140. In an embodiment, the space R functions as a wire arrangement space to hide wires on a front side of the motherboard 200 to a back side of the motherboard 200, to simplify the wire layout on the front side of the motherboard 200 and improve the visual effect. The space R also functions as an air passage at the back side of the motherboard 200, to improve the overall cooling effect for the motherboard 200.

The motherboard carrier 140 is located between the front plate 124 and the back plate 125. The front plate 124 includes an opening 1242 to display the graphics card 300. In an embodiment, the computer case 100 further includes a transparent plate 128. The transparent plate 128 is disposed on the front plate 124 and covers the opening 1242, to provide a dust-proof effect or protect the internal structure. In an embodiment, the motherboard carrier 140 further includes an extension portion 143 extending from an upper edge of the motherboard carrier 140 to the back side of the motherboard 200, to define the range of the space R.

Using the graphics card 300 in FIG. 1 as an example, the graphics card 300 is inserted on the motherboard 200 at a position near the front plate 124, so that the graphics card 300 deviates by an angle b in the computer case 100. In this way, not only the design of mechanisms on the surface of the graphics card 300 is presented to the outside to improve user experience, but also more space is provided for the motherboard to be disposed inside the case.

In particular, when the motherboard carrier 140 is obliquely disposed, an end of the motherboard carrier 140 near the front plate 124 is relatively close to the side surface 122, and the other end of the motherboard carrier 140 distant from the front plate 124 is spaced apart from the side surface 122 by a predetermined distance to form a space R. In this way, the configuration of the motherboard carrier 140 does not affect the vertical configuration of the graphics card 300 for taking up part of the width between the motherboard carrier 140 and the front plate 124. Further, an accommodating space (space R) for hiding wires is provided without increasing the size of the outer frame 120. It is to be appreciated that the distance between the motherboard carrier 140 and the side surface 122 is adjusted according to the sizes of components and is not limited herein.

In an embodiment, the computer case further includes a partition plate 129. The partition plate 129 is disposed on a back side of the bottom plate 127. The partition plate 129, the bottom plate 127, and the back plate 125 form an accommodating space S to accommodate a power supply. As shown in the drawings, a power supply 160 of the computer case 100 is adjusted to a position on the bottom plate 127 near the back plate 125, so that sufficient space is provided in the computer case 100 for installing and presenting the graphics card 300.

In an embodiment, the bending portion 1411 is spaced apart from the front plate 124 by a predetermined distance, to ensure that there is sufficient space between the motherboard 200, the front plate 124, and the outer frame 120 on the motherboard carrier 140 for accommodating the graphics card 300. In another embodiment, the motherboard carrier 140 is connected to the side surface 122 at a connection point (not shown). The motherboard carrier 140 and the side surface form a predetermined angle a at the connection point. The connection point is spaced apart from the front plate by a predetermined distance d. The predetermined distance d is adjusted according to the sizes of components and is not limited herein.

In an embodiment, the side surface 122 includes an air vent 1221. The air vent 1221 is located on the side surface and between the motherboard carrier 140 and the front plate 124. The air vent improves the air intake effect of a fan of the graphics card 300. In this embodiment, no hole needs to be formed on a decorative plate of the front plate 124, and the aesthetic of the front plate 124 is enhanced while maintaining the cooling performance.

In the foregoing embodiment, in accordance with the angle of inclination of the motherboard 200, the graphics card 300 is rotated by a predetermined angle b and vertically disposed in the computer case 100. Because the orientation of the graphics card 300 is perpendicular to that of the motherboard, the predetermined angle b is equal to the predetermined angle a. In this way, the design of mechanisms on the surface of the graphics card 300 is presented to the outside through the front surface and the side surface of the outer frame 120. According to actual requirements, the computer case 100 is used in combination with graphics cards disposed in other manners.

In an embodiment, apart from being separately disposed, the motherboard carrier of the computer case provided in the disclosure is formed by directly bending inward an existing side plate or motherboard carrier of the computer case, so that a motherboard fixed on the side plate or the motherboard carrier is obliquely disposed in the computer case.

Although the disclosure has been described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. A computer case, configured to dispose a motherboard and a graphics card therein, the computer case comprising:
    an outer frame, comprising a front plate, a bottom plate, and a side surface; and
    a wedge-shaped motherboard carrier, connected to the outer frame and configured to dispose the motherboard thereon, wherein the wedge-shaped motherboard carrier includes an inclined surface on which the motherboard is attached, and the inclined surface of the motherboard carrier and the side surface form a predetermined angle, and the predetermined angle is greater than 0°, wherein the outer frame further comprises a back plate, and the motherboard carrier is located between the front plate and the back plate to define a space in which the motherboard and graphics card is disposed in.

2. The computer case according to claim 1, wherein the predetermined angle is 0° to 90°.

3. The computer case according to claim 1, wherein the predetermined angle is 5° to 45°.

4. The computer case according to claim 1, further comprising a partition plate disposed on a back side of the bottom plate, wherein the partition plate, the bottom plate, and the back plate form an accommodating space to accommodate a power supply.

5. The computer case according to claim 1, wherein a space is formed between the side surface and the motherboard carrier.

6. The computer case according to claim 1, wherein an end of the motherboard carrier near the front plate is close to the side surface, and the other end of the motherboard carrier distant from the front plate is spaced apart from the side surface by a predetermined distance.

7. The computer case according to claim 6, wherein the side surface comprises an air vent, and the air vent is located between the motherboard carrier and the front plate.

\* \* \* \* \*